United States Patent Office 2,766,211
Patented Oct. 9, 1956

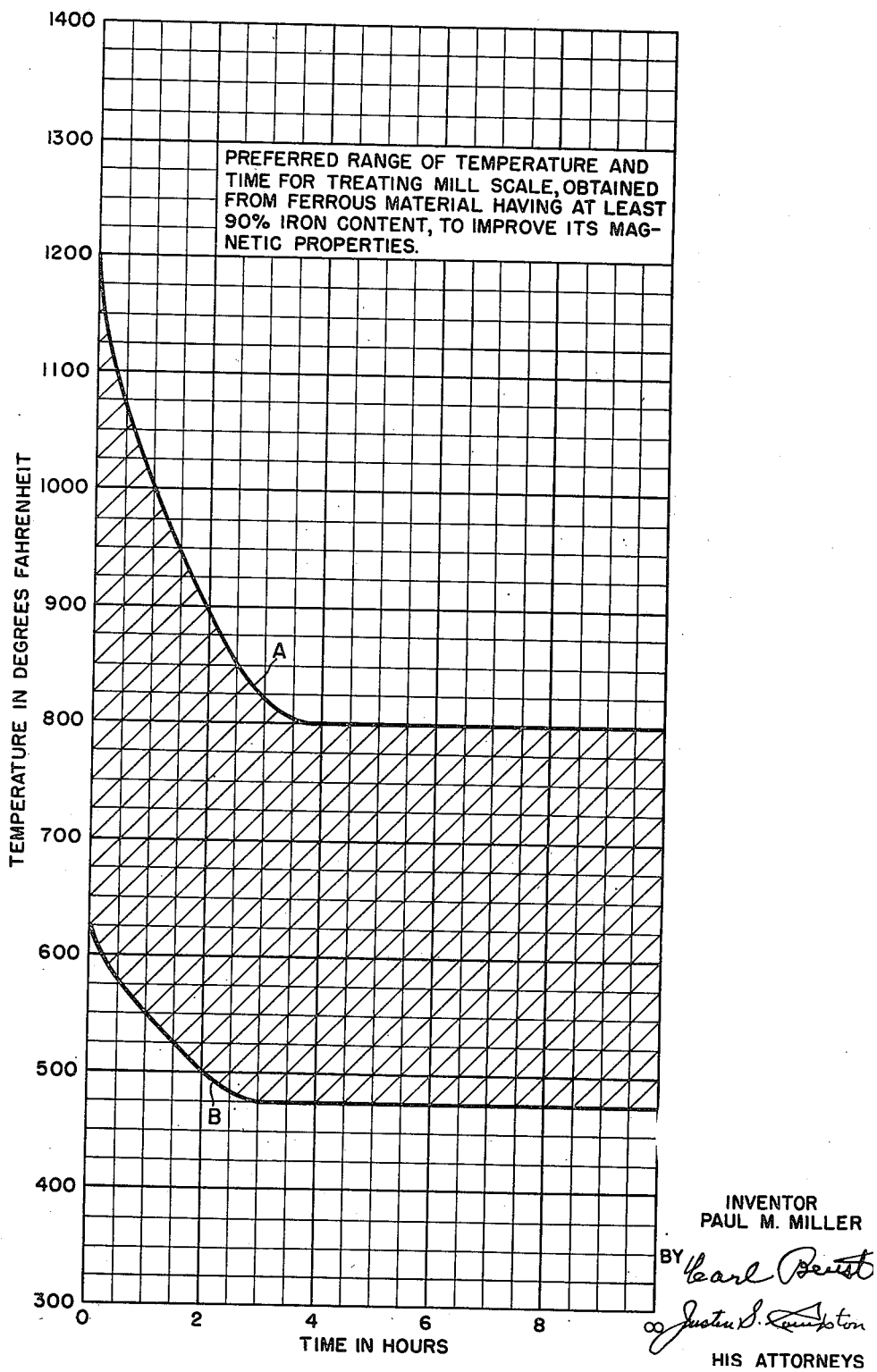

2,766,211

PROCESS FOR MAKING MAGNETIC POWDER

Paul M. Miller, Dayton, Ohio, assignor to The National Cash Register Company, Dayton, Ohio, a corporation of Maryland Application May 6, 1953, Serial No. 353,349

8 Claims. (Cl. 252—62.5)

This invention relates to a process for making magnetic iron oxide powder from mill scale, which is derived from the action of air on hot iron or iron alloy products. The invention more particularly pertains to such a process in which the mill scale is subjected to a heating step, preferably in the presence of an inert gas.

By "mill scale" is meant the oxides which form on red-hot iron or red-hot iron alloys while being worked in the air. While practically all iron or iron alloy mill scales are of the same composition, it has been found that mill scale produced from steel containing from .90 percent to .40 percent carbon, such as that obtained from wire-drawing processes using carbon steel, is eminently suitable from a composition and particle size standpoint. The process of drawing wire produces a mill scale of fairly fine particle size which is cleaner than most mill scales produced in other types of iron or iron alloy working processes. Generally speaking, mill scale produced in those types of operations in which the particle size is small is preferred to that mill scale produced in operations wherein the scale particle size is large, the latter being likely to be non-homogeneous and requiring more comminution. The mill scale, as it comes from the floor sweepings in a plant which converts the iron or iron alloy into products by the use of heat-forging, wire-drawing, rolling, and shaving, is the product which this novel process uses as the main ingredient.

In brief, the mill scale is cleaned, if necessary, and ground to the degree of fineness desired, which preferably is finer than that which will pass a standard 325 mesh screen. The mill scale then is heated to a temperature between 625 and 1,200 degrees Fahrenheit, preferably 660 degrees Fahrenheit, and maintained there for a time period depending on the selected temperature, in a nitrogen atmosphere, or equivalent inert surrounding, and cooled before being exposed to the air. The invention produces a magnetic iron oxide which is particularly high in coercivity and remanence. Inasmuch as it has been found that the coercivity declines as the maintained heating period is prolonged, and inasmuch as the remanence reaches a peak at a certain temperature and then declines, a preferred temperature and time to obtain the maximum combined coercivity and remanence has been found to be in the neighborhood of 660 degrees Fahrenheit and such maintained for a period of four to five hours. It appears that all types of mill scale react in substantially the same manner. The given preferred temperature and time gives a product having a coercivity of about 200 Oersteds and a remanence of about 600 Gausses. It is to be understood, however, that, in practicing the process of this invention, the preferred temperatures and times may be varied greatly and still be productive of a magnetic iron oxide of very high quality as regards coercivity and remanence. The effective range is shown in the drawing as the shaded area enclosed by lines A and B. The preferred nitrogen atmosphere introduced into the heating furnace is maintained therein at a pressure of about 1½ inches of water. As is the case with the other factors, other inert gases—that is to say, non-oxidizing types of gases—may be used in place of nitrogen. Generally speaking, the coercivity falls off as higher temperatures are used during the heating period, the temperature of 1,000 degrees Fahrenheit giving a product with lower coercivity as compared to that made at a temperature of 600 degrees Fahrenheit for the same period. The high remanence starts to decline when temperatures of over 800 degrees Fahrenheit are used. Temperatures under 475 degrees Fahrenheit are generally unsatisfactory in producing magnetic iron oxide from mill scale.

Therefore, it is an object of this invention to provide a process for producing high-grade magnetic iron oxide from mill scale.

With this and incidental objects in view, the process consists of certain steps and the use of certain ingredients, to be described, within preferred limits.

As an example of a specific embodiment of the process, 25 pounds of mill scale, obtained in the manufacture of music wire from .90 percent carbon content carbon steel, is ground in a ball mill, or a hammer mill, to a condition in which it passes through a 325 mesh sieve. This finely-ground mill scale is placed in a non-reactive tray, such as glass or stainless steel, and is introduced into a controlled-atmosphere furnace, having 1½ inches of water pressure of nitrogen continuously maintained therein. The furnace is kept at a temperature which will keep the mill scale at 660 degrees Fahrenheit for five hours, after which the tray is moved to an unheated portion of the furnace and allowed to come to room temperature, still in the presence of the nitrogen atmosphere. The magnetic iron oxide powder, thus made, will have a coercivity of about 200 Oersteds and a remanence of about 550 to 650 Gausses. In the particular example given, the mill scale, before heat treatment, was found to contain about 55% ferrous oxide (FeO) and 45% ferroso-ferric oxide ($Fe_3O_4$), with small percentages of $Fe_2O_3$ and metallic iron (Fe). After the described heat treatment, the analysis of this material is approximately 65% ferroso-ferric oxide ($Fe_3O_4$), 30% ferrous oxide (FeO), and 5% of a mixture of ferric oxide ($Fe_2O_3$) and metallic iron (Fe). The superior magnetic iron oxide thus produced from cheap ingredients is eminently satisfactory in making record materials which are to be used in magnetic recording of spot signals or audio signals. This magnetic iron oxide material is black and is of the generally fine particle size that it was when it was withdrawn from the ball mill or hammer mill, not forming agglomerate particles in the process of heating. It may be applied to a paper backing or other sheet-forming material, such as cellulose acetate sheets or vinyl polymer sheets, by use of any binder, such as a varnish, lacquer, or such synthetic resinous material as polyvinyl alcohol.

The same mill scale, when treated at a temperature of 500 degrees Fahrenheit for five hours, showed a coercivity of 250 Oersteds and a remanence of 490 Gausses, and, when treated at a temperature of 800 degrees for five hours, the coercivity is 150 Oersteds and the remanence is 750 Gausses. From the foregoing it will be seen that magnetic iron oxide of substantially good magnetic characteristics can be obtained at these widely different temperatures.

The remanence drops off rapidly after a temperature of 900 degrees Fahrenheit is reached, it being the general experience that a shorter heating period at the higher temperatures is better than a longer heating period.

Alloy steels may be used as a source of the mill scale, it being probable that the mill scale formed is of substantially the same composition, regardless of the alloy composition of the steel in question, because the iron oxides are formed first with the oxygen of the atmosphere to the exclusion of any formation of oxides of the other ingredients of the alloy, although such other oxides may form slight impurities in such mill scale. For instance, in the case of a mill scale from cobalt-steel alloy containing 18% cobalt, the magnetic iron oxide produced by the novel method of this invention, when heated to a temperature of 660 degrees Fahrenheit for five hours, gave magnetic material with a coercivity of 330 Oersted and a remanence of 480 Gausses. This same material, when heated to 500 degrees Fahrenheit for five hours, gave a product with a coercivity of 350 Oersteds and a remanence of 300 Gausses. At 800 degrees Fahrenheit for five hours, this same mill scale gave a product with a coercivity of 300 Oersteds and a remanence of 600 Gausses.

The process of this invention, when utilizing 99.9% pure iron, gives a mill scale which, when heated to 550 degrees Fahrenheit for five hours in the nitrogen atmosphere, gives a magnetic iron oxide having a coercivity of 280 Oersteds and a remanence of 560 Gausses. At 660 degrees Fahrenheit, this same material has a coercivity of 200 Oersteds and a remanence of 600 Gausses. At a heat treatment of 800 degrees Fahrenheit, the same material has a coercivity of 140 Oersteds and a remanence of 950 Gausses.

One of the remarkable things about this process is that, no matter from what source the mill scale comes, the magnetic iron oxide produced therefrom is to a large extent uniform in regard to coercivity and remanence, the time and temperatures used being equal. Five hours is the recommended time at the preferred temperature of 660 degrees Fahrenheit. If a lower temperature is to be used, the general rule to follow is that a longer heating time is necessary, and, vice versa, if a higher temperature is used, a shorter heating time should be used. If a temperature of 900 degrees Fahrenheit is to be used, the heating period should be only about three hours, whereas, if a 500-degree Fahrenheit temperature is used, the heating period should be in excess of five hours.

Prolonged heating of the mill scale beyond the five-hour period is satisfactory provided a temperature of 800 degrees Fahrenheit is not exceeded.

The process is adapted to treating mill scale of larger particle size than that mentioned in the preferred embodiment, and, consequently, the process is not restricted to such finely-ground mill scale specified as preferable.

If desired, the black finished powdered product may be mixed with other metallic oxides to blend magnetic properties or to give the mixture a color other than black. For instance, the reddish magnetic ferric oxide could be used as an additive to give a more pleasing color to the material to be applied to a record base sheet or tape, the magnetic properties of such mixture being an average of the characteristics of the ingredients as calculated on a percentage basis.

By referring to the drawing, it will be evident that between the temperatures of 625 degrees Fahrenheit and 800 degrees Fahrenheit the heating period may be for any length of time desired.

What is claimed is:

1. The process of making a material rich in magnetic iron oxide from mill scale derived from the working of red-hot iron and its alloys in air, including the step of maintaining the mill scale at a temperature of between 475 degrees Fahrenheit and 1,200 degrees Fahrenheit in an inert atmosphere within the time limits indicated by the shaded area between lines A and B of the drawing.

2. The process of claim 1 in which the mill scale used is derived from steel containing .90 percent to .40 percent carbon.

3. The process of claim 1 in which the heating of the mill scale is done in a nitrogen atmosphere.

4. The process of claim 1 in which the heated mill scale is allowed to cool to room temperature in an inert atmosphere.

5. The process of claim 1 in which the heating of the mill scale is done in a nitrogen atmosphere and the heated mill scale is allowed to cool to room temperature in said nitrogen atmosphere.

6. The process of making a material rich in magnetic iron oxide from mill scale formed during the working of hot iron and its alloys in air, including the step of heating the mill scale to a temperature of between 625 degrees Fahrenheit and 800 degrees Fahrenheit, in an inert gas, for any desired length of time.

7. The process of claim 6 in which the heated mill scale is allowed to cool to room temperature in said gas.

8. The process of claim 7 in which the mill scale has been comminuted to the desired particle size before being heated.

References Cited in the file of this patent

UNITED STATES PATENTS

| | | |
|---|---|---|
| 1,075,709 | Goldschmidt | Oct. 14, 1913 |
| 1,682,364 | Ballantine et al. | Aug. 28, 1928 |
| 1,702,250 | Delachaux | Feb. 19, 1929 |
| 2,575,099 | Crowley | Nov. 13, 1951 |